(12) United States Patent
Maeda et al.

(10) Patent No.: US 7,818,439 B2
(45) Date of Patent: Oct. 19, 2010

(54) TRANSMISSION APPARATUS, RECEPTION APPARATUS AND TRANSMISSION/RECEPTION APPARATUS FOR IMAGE AND/OR AUDIO DATA AND OTHER THAN IMAGE AND/OR AUDIO DATA

(75) Inventors: Satoru Maeda, Kanagawa (JP); Hideki Yoshida, Kanagawa (JP); Manabu Onishi, Tokyo (JP); Kei Yamashita, Kanagawa (JP); Kazuyuki Ikeda, Tokyo (JP); Daisuke Kawaguchi, Kanagawa (JP); Munehiro Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1212 days.

(21) Appl. No.: 10/479,294

(22) PCT Filed: May 24, 2002

(86) PCT No.: PCT/JP02/05034

§ 371 (c)(1),
(2), (4) Date: May 24, 2004

(87) PCT Pub. No.: WO02/098103

PCT Pub. Date: Dec. 5, 2002

(65) Prior Publication Data

US 2004/0215796 A1   Oct. 28, 2004

(30) Foreign Application Priority Data

May 29, 2001   (JP) .............................. 2001-160621

(51) Int. Cl.
*G06F 15/16*   (2006.01)
*G06F 9/44*   (2006.01)

(52) U.S. Cl. ........................ 709/230; 709/232; 719/322

(58) Field of Classification Search ................... 719/310, 719/322; 709/200, 232, 230, 233; 455/414.3, 455/430

See application file for complete search history.

(56) References Cited

U.S. PATENT DOCUMENTS 5,448,568 A * 9/1995 Delpuch et al. .......... 348/423.1

(Continued)

FOREIGN PATENT DOCUMENTS

EP   0 613 274   8/1994

(Continued)

OTHER PUBLICATIONS

Schulzrinne H et al: "Internet Telephony: architecture and protocols—an IETF perspective" Computer Networks, Elsevier Science Publishers B.V., Amsterdam, NL, vol. 31, No. 3, Feb. 11, 1999, pp. 237-255, XP004304601 ISSN: 1389-1286.

*Primary Examiner*—Van H Nguyen
(74) *Attorney, Agent, or Firm*—Frommer Lawrence & Haug LLP; William S. Frommer; Thomas F. Presson

(57) ABSTRACT

The present invention provides a transmission/reception apparatus capable of achieving both a high processing speed and good extensibility in performing communication protocol processes. Used for transmitting data in accordance with a predetermined communication protocol and receiving data transmitted in accordance with the predetermined communication protocol, the transmission/reception apparatus has a configuration capable of executing communication protocol processes by using hardware (in first and second communication-protocol-processing units) and software (in first and second control units). The hardware or the software can be selected properly in accordance with the type of data. For example, a communication protocol process for data regarded as a heavy processing load can be carried out by using the hardware at the high processing speed whereas a communication protocol process for data regarded as a light processing load can be carried out by using the software, which offers the good extensibility.

8 Claims, 9 Drawing Sheets

U.S. PATENT DOCUMENTS

| | | | |
|---|---|---|---|
| 5,548,532 A * | 8/1996 | Menand et al. | 370/477 |
| 5,625,845 A * | 4/1997 | Allran et al. | 719/322 |
| 5,974,460 A * | 10/1999 | Maddalozzo et al. | 709/224 |
| 5,999,979 A * | 12/1999 | Vellanki et al. | 709/232 |
| 6,002,394 A * | 12/1999 | Schein et al. | 725/39 |
| 6,028,600 A * | 2/2000 | Rosin et al. | 715/718 |
| 6,052,715 A * | 4/2000 | Fukui et al. | 725/114 |
| 6,073,171 A * | 6/2000 | Gaughan et al. | 725/110 |
| 6,195,692 B1 * | 2/2001 | Hsu | 725/110 |
| 6,208,639 B1 * | 3/2001 | Murai | 370/356 |
| 6,266,701 B1 * | 7/2001 | Sridhar et al. | 709/232 |
| 6,285,659 B1 * | 9/2001 | Feuerstraeter et al. | 370/244 |
| 6,295,057 B1 * | 9/2001 | Rosin et al. | 715/744 |
| 6,298,372 B1 * | 10/2001 | Yoshikawa | 709/200 |
| 6,397,387 B1 * | 5/2002 | Rosin et al. | 725/44 |
| 6,493,763 B1 * | 12/2002 | Suzuki | 709/231 |
| 6,600,930 B1 * | 7/2003 | Sakurai et al. | 455/414.3 |
| 6,801,768 B2 * | 10/2004 | Gleyzes et al. | 455/430 |
| 6,867,749 B1 * | 3/2005 | Il et al. | 345/1.1 |
| 6,970,935 B1 * | 11/2005 | Maes | 709/230 |
| 7,584,293 B1 * | 9/2009 | Graf et al. | 709/232 |

FOREIGN PATENT DOCUMENTS

| | | |
|---|---|---|
| JP | 7-46292 | 2/1995 |
| JP | 9-247237 | 9/1997 |
| JP | 10-23059 | 1/1998 |
| JP | 2000-49888 | 2/2000 |
| WO | WO 97 22201 | 6/1997 |

* cited by examiner

FIG. 4

| SERVICE IDENTIFICATION INFORMATION | BUFFER |
|---|---|
| 1 | HARDWARE-USE RECEPTION BUFFER |
| 4 | SOFTWARE-USE RECEPTION BUFFER |
| INITIALLY SET BUFFER | SOFTWARE-USE RECEPTION BUFFER |

FIG. 5

| TRANSMISSION-SOURCE IP ADDRESS | TRANSMISSION-SOURCE PORT NUMBER | TRANSMISSION-DESTINATION IP ADDRESS | TRANSMISSION-DESTINATION PORT NUMBER | BUFFER |
|---|---|---|---|---|
| 192.10.10.1 | 100 | 192.10.10.2 | 90 | HARDWARE-USE RECEPTION BUFFER |
| 192.10.10.3 | 10 | 192.10.10.2 | 10 | SOFTWARE-USE RECEPTION BUFFER |
| INITIALLY SET BUFFER | | | | SOFTWARE-USE RECEPTION BUFFER |

TRANSMISSION APPARATUS, RECEPTION APPARATUS AND TRANSMISSION/RECEPTION APPARATUS FOR IMAGE AND/OR AUDIO DATA AND OTHER THAN IMAGE AND/OR AUDIO DATA

TECHNICAL FIELD

The present invention relates to a transmission apparatus for transmitting data in accordance with a predetermined communication protocol, a reception apparatus for receiving data in accordance with the predetermined communication protocol and a transmission/reception apparatus for transmitting and receiving data in accordance with the predetermined communication protocol.

BACKGROUND ART

Before, the inventor of the present invention developed a television receiver having Internet functions, and has proposed a transmission/reception system with a configuration including a base-station apparatus and a monitor apparatus connected to the base-station apparatus by radio communication.

Typically, since a reception antenna for television broadcasting can be connected to the base-station apparatus of the transmission/reception system, the base-station apparatus is capable of selecting a television broadcast signal, receiving a selected television broadcast signal and demodulating a received television broadcast signal. In addition, the base-station apparatus is capable of converting a video signal obtained in this way into compressed video data as well as outputting and transmitting the compressed video data. Furthermore, by employing a modem, the base-station apparatus can be connected to the Internet by using a telephone line. Moreover, the base-station apparatus also has a browser function for displaying data, which is received from a web site typically by way of the Internet, as an image. In addition, the base-station apparatus also has an email function. The base-station apparatus is capable of outputting/transmitting displayed data of a mail application and information of a browser image obtained by using the browser function as compressed video data.

The monitor apparatus has such a small size that the user is capable of carrying about the apparatus in a room for example. The monitor apparatus decodes video data transmitted by the base-station apparatus and displays an image as well as outputs a sound as results of decoding. In addition, the monitor apparatus also allows the user to carry out operations against the browser screen and operations manipulating emails. Information generated as a result of such an operation is transmitted to the base-station apparatus. In the base-station apparatus, browser and email applications operate in accordance with operation information received from the monitor apparatus so that accesses to the Internet can be made and emails can be sent and received.

With such a transmission/reception system, the user is allowed typically to carry about the monitor apparatus or put the apparatus at any arbitrary place. That is to say, the user is capable of watching a television broadcast and making use of the Internet at any arbitrary place as long as the place is in a domain allowing communications.

FIG. 8 is a block diagram showing members for mainly transmitting and receiving data in internal configurations of a base-station apparatus and a monitor apparatus, which compose the transmission/reception system described above.

In the base-station apparatus 50, AV (Audio and Visual) data is supplied to an AV encoder 51. The AV data is obtained as a result of converting an image/sound signal such as a television signal into digital data. The AV encoder 51 compresses the AV data by adoption of a predetermined image/sound compression technique.

Compressed AV data output by the AV encoder 51 is supplied to a first communication-protocol-processing unit 52 for carrying out processing including a process to enclose the data in a packet conforming to a predetermined communication protocol.

In the case, a first control unit 54 controls the AV encoder 51. For example, the first control unit 54 controls the AV encoder 51 to change the compressibility (data rate) in accordance with a reception state reported by the apparatus on the reception side.

The first communication-protocol-processing unit 52 is a special-purpose circuit for carrying out a communication protocol process. The first communication-protocol-processing unit 52 constitutes hardware for carrying out transmission/reception processes according to a communication protocol.

The first communication-protocol-processing unit 52 carries out a necessary transmission process according to the communication protocol on input AV data to be transmitted. An example of the transmission process is a process to enclose the AV data in a packet. Data completing the transmission process is then supplied to a first transmission/reception unit 53.

The first transmission/reception unit 53 outputs the input data as an electromagnetic wave by adoption of radio communication.

Furthermore, the base-station apparatus 50 may transmit data other than AV data. Examples of the other data are data related to email and communication control information. In this case, in the configuration shown in the figure, the other data is supplied to the first communication-protocol-processing unit 52 under control executed by a first control unit 54. Thus, the other data is also transmitted from the first transmission/reception unit 53 by using radio communication.

In addition, the first transmission/reception unit 53 also receives data transmitted by the monitor apparatus 60 and then passes on the data to the first communication-protocol-processing unit 52. In this case, the first communication-protocol-processing unit 52 extracts the data from a packet in accordance with the communication protocol and then supplies the data typically to the first control unit 54. Then, the first control unit 54 carries out necessary control processing on the data on the basis of the substance of the data supplied thereto.

Data transmitted by the base-station apparatus 50 to the monitor apparatus 60 is received by a second transmission/reception unit 61 employed in the monitor apparatus 60 before being supplied to a second communication-protocol-processing unit 62.

For example, the second communication-protocol-processing unit 62 receives compressed AV data as input data received from the second transmission/reception unit 61. In this case, the AV data is supplied to an AV decoder 63. The AV decoder 63 decodes the compressed AV data and outputs typically AV data as a result of decoding. A display unit not shown in the figure shows an image based on the AV data received from the AV decoder 63 typically on a display screen of the monitor apparatus.

The data supplied to the second communication-protocol-processing unit 62 may be other than compressed AV data. Also in this case, the second communication-protocol-processing unit 62 supplies the data other than compressed AV data to a second control unit 64.

In addition, the monitor apparatus 60 may transmit necessary information to the base-station apparatus 50 as transmission data. For example, the second control unit 64 monitors an operation carried out by the AV decoder 63 and sets a proper compressibility for compressed AV data in accordance with an error. Then, as necessary information, the monitor apparatus 60 transmits control information to the base-station apparatus 50. On the basis of the control information, the AV encoder 51 employed in the base-station apparatus 50 is capable of carrying out a compression process at the set compressibility.

In such a case, the second control unit 64 supplies the data to be transmitted to the second communication-protocol-processing unit 62. The second communication-protocol-processing unit 62 then carries out processing according to a predetermined communication protocol on the data to be transmitted. The processing includes a process to enclose the data to be transmitted in a packet. The packet is then transmitted from the second transmission/reception unit 61 by a radio communication.

FIG. 9 is a block diagram showing internal configurations of another base-station apparatus and another monitor apparatus. It is to be noted that the figure also shows only members for mainly transmitting and receiving data. In addition, members identical with their counterparts shown in FIG. 8 are denoted by the same reference numerals as the counterparts and their explanation is not repeated.

The first communication-protocol-processing unit 52 and the first control unit 54, which are employed in the base-station apparatus 50 shown in FIG. 8, are omitted. Instead, a first CPU 55 is employed in the base-station apparatus 50 shown in FIG. 9.

The first CPU 55 carries out transmission data processing according to a communication protocol on data to be transmitted such as compressed AV data received from the AV encoder 51. The transmission data processing includes a process to enclose the compressed AV data in a packet. The first CPU 55 then drives the first transmission/reception unit 53 to transmit data obtained as a result of the processing to the monitor apparatus 60. The base-station apparatus 50 may transmit data other than AV data to the monitor apparatus 60. Also in this case, the first CPU 55 carries out transmission data processing according to the communication protocol on the other data. The transmission data processing includes a process to enclose the other data in a packet. The first CPU 55 then drives the first transmission/reception unit 53 to transmit data obtained as a result of the processing to the monitor apparatus 60. The first transmission/reception unit 53 carries out reception data processing according to the communication protocol on data received from the monitor apparatus 60. The reception data processing includes a process to extract the received data from a packet enclosing the data.

In addition, the first CPU 55 also controls the AV encoder 51 to change the compressibility (data rate) in accordance with the reception state reported by the apparatus on the reception side.

As described above, the base-station apparatus 50 shown in FIG. 9 carries out processing according to a communication protocol by execution of a program on data to be transmitted and received data in addition to processing to control components such as the AV encoder 51. As described above, the processing according to a communication protocol includes a process to enclose data to be transmitted in a packet. That is to say, the first CPU 55 employed in the base-station apparatus 50 has the functions of the first communication-protocol-processing unit 52 and the first control unit 54, which have been described earlier. In particular, the processing according to a communication protocol is carried out by execution of software.

By the same token, the monitor apparatus 60 shown in FIG. 9 employs a second CPU 65 as a substitute for the second communication-protocol-processing unit 62 and the second control unit 64, which are shown in FIG. 8.

Thus, the second CPU 65 employed in the monitor apparatus 60 has the functions of the second communication-protocol-processing unit 62 and the second control unit 64, which have been described earlier. In particular, the processing according to a communication protocol is carried out by execution of software.

In the configurations of the base-station apparatus 50 and the monitor apparatus 60, which are shown in FIG. 8, the processing according to a communication protocol is carried out by the first communication-protocol-processing unit 52 and the second communication-protocol-processing unit 62, which are each a special-purpose circuit implemented by hardware. Thus, the transmission/reception system offers a merit that the processing can be carried out at a sufficiently high speed even for data having a high data rate and imposing a requirement for time-series continuity as is the case with AV data. On the other side of the coin, however, if the processing according to a communication protocol is entirely carried out by using hardware, the expandability is poor. For example, if the communication protocol is somewhat changed, there is raised a problem of a difficulty to keep up with such a change.

In the base-station apparatus 50 and the monitor apparatus 60, which are shown in FIG. 9, on the other hand, the processing according to a communication protocol is carried out by using software. Thus, in order to keep up with changes such as a change in communication protocol, the program executed to carry out the processing according to a communication protocol is just modified. It is therefore easy to keep up with such a change and there is no cost. Such configurations of the base-station apparatus 50 and the monitor apparatus 60 are advantageous from the expandability point of view. However, they are disadvantageous from the processing-speed point of view. In the present state of the art, in particular, in order to carry out the processing correctly for data having a high data rate and imposing a requirement for time-series continuity as is the case with AV data handled in the transmission/reception system described above, it is necessary to use a component such as a CPU with an extremely high speed. As a result, a very high cost will be incurred.

DISCLOSURE OF THE INVENTION

It is thus an object of the present invention addressing the problems described above to provide a transmission apparatus and a reception apparatus, which offer excellent expandability as well as have a high speed in carrying out processing according to a communication protocol.

In order to achieve the object described above, there is provided a transmission apparatus with a configuration including: first communication-protocol-processing means for carrying out necessary processing in accordance with a predetermined communication protocol on data to be transmitted by using hardware; second communication-protocol-processing means for carrying out necessary processing in accordance with the predetermined communication protocol on data to be transmitted by using software; transmission means for outputting and transmitting the data being transmitted; and connection-switching means capable of selecting the first communication-protocol-processing means or the second communication-protocol-processing means as means to be connected to the transmission means.

In addition, there is provided a reception apparatus with a configuration including: reception means for receiving data transmitted in accordance with a predetermined communication protocol; first communication-protocol-processing means for carrying out necessary processing in accordance with the predetermined communication protocol on received data by using hardware; second communication-protocol-processing means for carrying out necessary processing in accordance with the predetermined communication protocol on received data by using software; and connection-switching means capable of selecting the first communication-protocol-processing means or the second communication-protocol-processing means as means to be connected to the reception means.

Furthermore, there is provided a transmission/reception apparatus with a configuration including: first communication-protocol-processing means for carrying out necessary processing in accordance with a predetermined communication protocol on data to be transmitted or necessary processing in accordance with the predetermined communication protocol on received data by using hardware; second communication-protocol-processing means for carrying out necessary processing in accordance with the predetermined communication protocol on data to be transmitted or necessary processing in accordance with the predetermined communication protocol on received data by using software; transmission/reception means for outputting and transmitting the data being transmitted in accordance with the predetermined communication protocol or for receiving data transmitted in accordance with the predetermined communication protocol; and connection-switching means capable of selecting the first communication-protocol-processing means or the second communication-protocol-processing means as means to be connected to the transmission/reception means.

The transmission and reception apparatus with the configurations described above employs the first communication-protocol-processing means based on hardware and the second communication-protocol-processing means based on software to carry out processing according to a communication protocol on data to be transmitted and received data respectively. That is to say, the communication protocol can be implemented by using both the hardware and software.

BRIEF DESCRIPTION OF DRAWINGS

FIG. 4 is an explanatory diagram referred to in describing a typical operation to switch communication-protocol processing on the basis of information described in a TOS;

FIG. 5 is an explanatory diagram referred to in describing a typical operation to switch communication-protocol processing on the basis of an IP address and a port number;

BEST MODE FOR CARRYING OUT THE INVENTION

An embodiment of the present invention is explained as follows. In explaining the embodiment, a typical indoor application such as an application in a house is assumed. In the explanation, a transmission/reception system is taken as an example. The transmission/reception system has a configuration including a base-station apparatus and a monitor apparatus connected to the base-station apparatus by radio communication. That is to say, a transmission apparatus provided by the present invention is applied to the transmission functions of the base-station apparatus and the monitor apparatus, which are employed in the embodiment. On the other hand, a reception apparatus provided by the present invention is applied to the reception functions of the base-station apparatus and the monitor apparatus.

Figure 1:
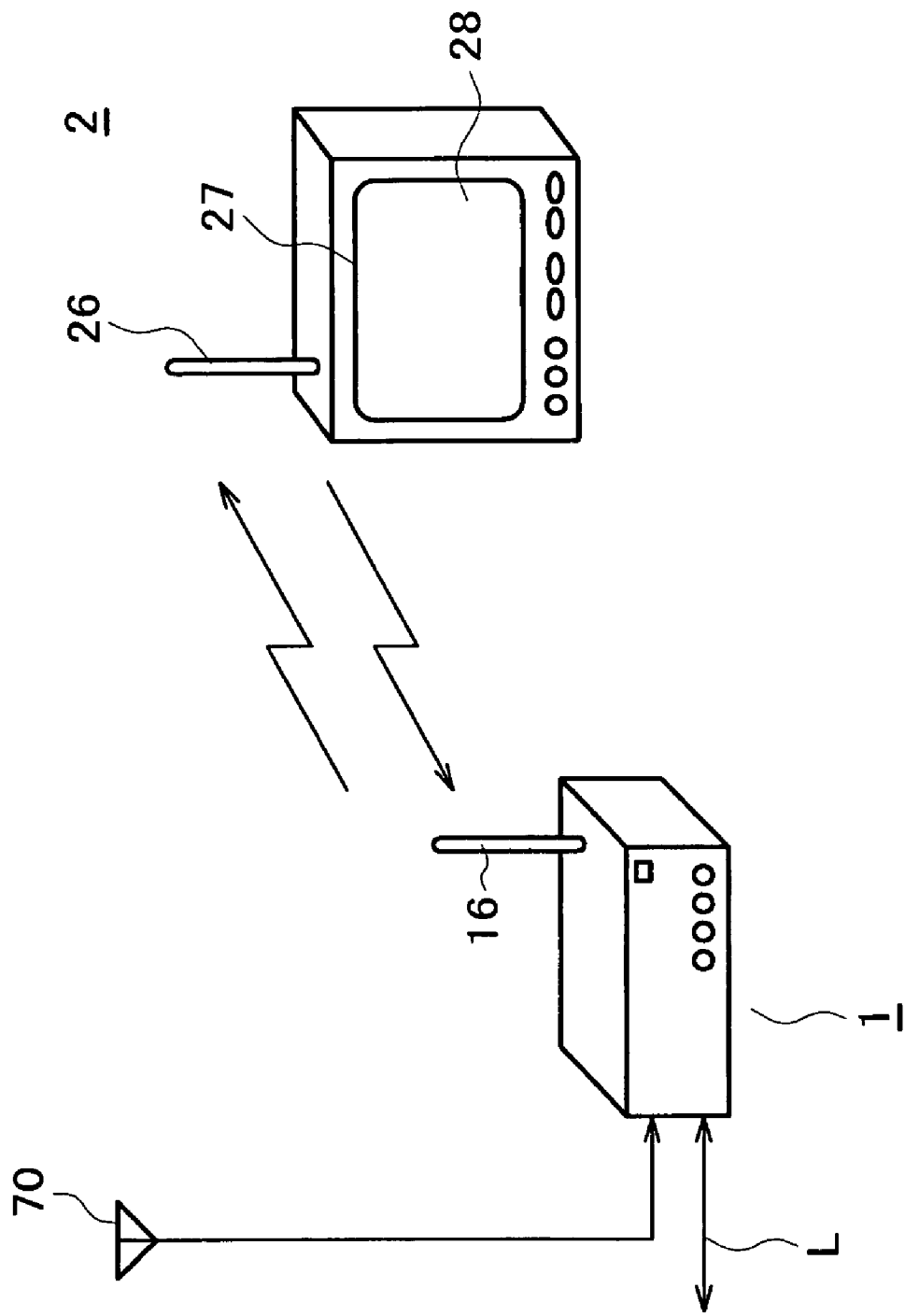
FIG. 1 is a diagram showing a typical implementation of a transmission/reception system including a base-station apparatus and a monitor apparatus in accordance with an embodiment of the present invention.

FIG. 1 is a diagram showing a typical implementation of a transmission/reception system as a present embodiment in a simple and plain manner.

The transmission/reception system implemented by the embodiment includes the base-station apparatus 1 and the monitor apparatus 2, which are shown in FIG. 1, and is typically used indoors in a house. The base-station apparatus 1 and the monitor apparatus 2 are capable of carrying out a radio communication with each other as will be described later.

Typically, the base-station apparatus 1 is installed indoors at a stationary place inside a home. The base-station apparatus 1 has a function to select a television broadcasting channel and receive a television broadcast from the selected channel as well as demodulate the received television broadcast. In addition, the base-station apparatus 1 also has a function to make accesses to a web site through the Internet and a function to exchange emails through the Internet. In brief, the base-station apparatus 1 is provided with a television-broadcast reception function and an Internet function.

Thus, for the television-broadcast reception function, the base-station apparatus 1 can be connected to an antenna 70 for receiving television broadcasts. The base-station apparatus 1 selects a television broadcasting channel and receives a television broadcast signal from the selected channel as well as demodulates the received television broadcast signal in order to obtain a television signal. Then, the base-station apparatus 1 converts this television signal into compressed video/audio data (AV data) in a compression process adopting an MPEG technique.

It is to be noted that the base-station apparatus 1 employed in the embodiment also has a video input terminal for inputting a video/audio signal from typically external AV equipment. A video/audio signal input to the video input terminal can also be converted into compressed AV data.

In addition, the base-station apparatus 1 also includes an embedded modem for the Internet function. The modem is connected to a telephone line L of a telephone-line network, which is typically connected to the Internet through a provider. Furthermore, the base-station apparatus 1 has stored applications for making accesses to a web site and exchanging emails through the Internet connected in this way.

Moreover, the base-station apparatus 1 generates an interface image for purposes including inspections of web sites and implementation of the email function as a television signal. Then, the base-station apparatus 1 outputs this generated television signal as a substitute for an image signal of the broadcast signal cited above. The base-station apparatus 1 is also capable of synthesizing a generated television signal with an image signal of the broadcast signal.

In addition, the television signal generated as described above can also be converted into compressed AV data by carrying out a compression process adopting the MPEG technique.

Furthermore, the base-station apparatus 1 is also capable of outputting and transmitting the compressed AV data obtained as described above as an electromagnetic wave by radio communication from an antenna 16. To be more specific, the base-station apparatus 1 is also capable of transmitting image information by radio communication as an interface image including an Internet image and an image of a television broadcast received from a selected channel. Moreover, the base-station apparatus 1 is also capable of outputting and transmitting various kinds of data by radio communication besides image information. Information transmitted by the base-station apparatus 1 can be received by the monitor apparatus 2, which is explained later.

In addition, the base-station apparatus 1 is capable of receiving various kinds of data transmitted by the monitor apparatus 2. The data transmitted by the monitor apparatus 2 is for example operation information. The base-station apparatus 1 is then capable of carrying out a necessary operation according to the data received from the monitor apparatus 2.

The monitor apparatus 2 has such a small size that the user is capable of carrying about the apparatus 2 in a room for example.

An antenna 26 employed in the monitor apparatus 2 receives a signal transmitted by the base-station apparatus 1 as an electromagnetic wave and then supplies the signal to the inside of the monitor apparatus 2. If the input received signal is compressed AV data, the data is demodulated to generate a television signal.

The monitor apparatus 2 has a display unit 27 serving as a display device implemented typically by an LCD (Liquid Crystal Display) device. The monitor apparatus 2 displays the television signal generated as described above on the display unit 27 as an image. Thus, the monitor apparatus 2 is capable of displaying/outputting an image of a television broadcast received from a channel selected by the base-station apparatus 1 and displaying/outputting an interface image including an Internet image. Since the monitor apparatus 2 also has a speaker, the monitor apparatus 2 is capable of outputting sounds/voices such as those of a television broadcast and those generated in response to an operation carried out on an Interface image.

In addition, a touch panel 28 is installed for the display unit 27 serving as a display member. If an operation carried out on the touch panel 28 is detected, information for the operation is generated.

If necessary, information for an operation carried out on the touch panel 28 is transmitted to the base-station apparatus 1 from the antenna 26 through the radio wave. Then, the base-station apparatus 1 carries out necessary control processing based on the information received from the monitor apparatus 2. By carrying out operations including such exchanges of information, it is possible to switch from the monitoring function of a television receiver to the Internet function or vice versa, and possible to select the channel of a television broadcasting station. The Internet function allows an operation to be carried out with respect to the browser. In addition, the Internet function also allows operations related to emails to be carried out. The operations include operations to receive and display an email destined for the monitor apparatus 2 as well as create and send a new email.

As described above, the base-station apparatus 1 has information interface functions to receive a television signal from a television broadcasting station or an external AV apparatus besides information from the Internet as well as output and transmit information to the Internet. On the other hand, the monitor apparatus 2 has a function to present a television signal and Internet information, which are received by the base-station apparatus 1, to the user in the form of images and sounds/voices and has a user interface function to receive an operation input entered by the user to the transmission/reception system.

In a house, the base-station apparatus 1 is installed at such a location that an antenna terminal and telephone-line terminal of the base-station apparatus 1 can be connected with ease to the antenna 70 and the telephone line L respectively by taking the positions of the antenna and telephone-line terminals on the base-station apparatus 1 into consideration. The base-station apparatus 1 installed in this way is connected to the monitor apparatus 2 by radio communication so that the user is allowed to carry about the monitor apparatus 2 at any arbitrary place desired by the user to enjoy a television broadcast and the Internet as long as the place is within a domain in which the base-station apparatus 1 is capable of communicating with the monitor apparatus 2.

By the way, the communication protocol adopted by the embodiment to implement communications between the base-station apparatus 1 and the monitor apparatus 2 is not specified specially. As an example, however, the TCP/IP adopted by the Internet is adopted also in this embodiment. This is because the TCP/IP is already widely known and popular, offering a merit that the protocol is easy to use.

For the above reason, the embodiment is characterized in that its configuration of the base-station apparatus 1 and the monitor apparatus 2 is the configuration of a communication-protocol-processing system for carrying out a process corresponding to the TCP/IP communication protocol. Thus, the following description explains a configuration for a communication-protocol process carried out in the base-station apparatus 1 and the monitor apparatus 2.

Figure 2:
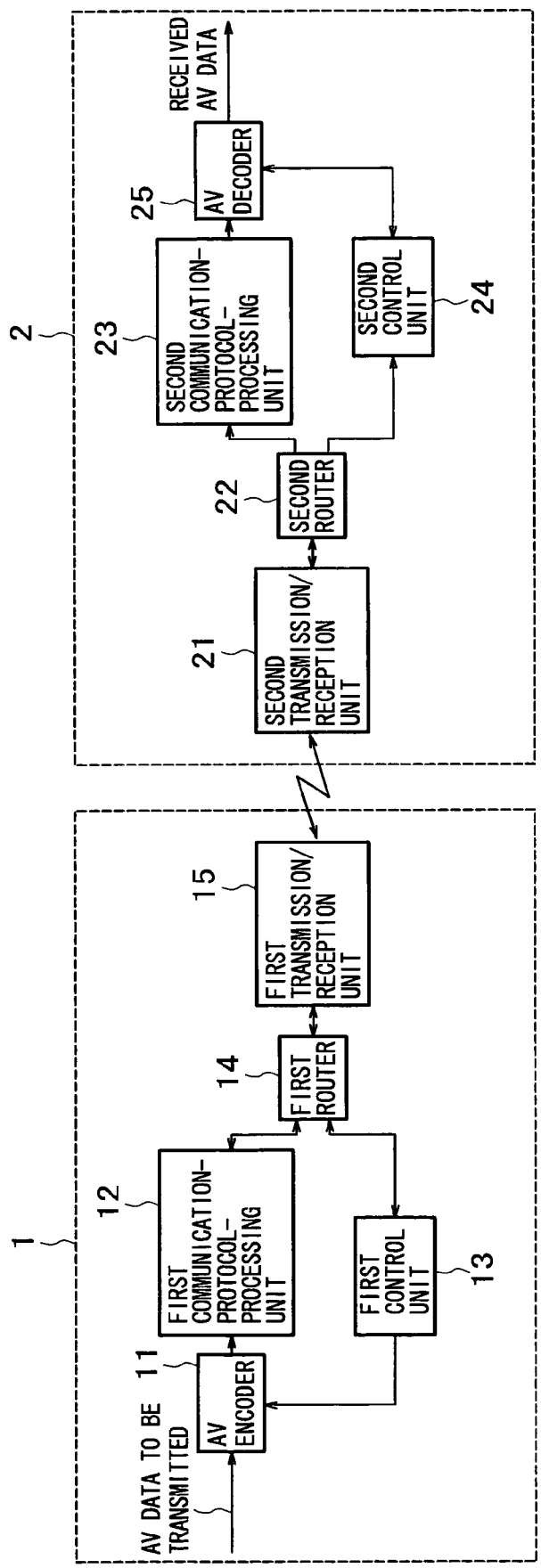
FIG. 2 is a block diagram showing typical internal configurations of the base-station apparatus and the monitor apparatus.

FIG. 2 shows members mainly involved in radio communications between the base-station apparatus 1 and the monitor apparatus 2 in internal configurations of the base-station apparatus 1 and the monitor apparatus 2.

AV data to be transmitted to the monitor apparatus 2 is supplied to an AV encoder 11 employed in the base-station apparatus 1. It is to be noted that the AV data to be transmitted is obtained as a result of an analog-to-digital conversion process carried out on a television signal. The television signal is typically a television signal obtained as a result of receiving a television broadcast, a television signal input from external AV equipment or a television signal of an interface image including an Internet image generated in the base-station apparatus 1.

The AV encoder 11 carries out a compression process on the input AV data in accordance with the MPEG technique and then outputs AV compressed data to a first communication-protocol-processing unit 12.

The first communication-protocol-processing unit 12 carries out a necessary communication protocol process according to the TCP/IP, which is a communication protocol adopted by the embodiment.

To put it in detail, the first communication-protocol-processing unit 12 carries out processing such as a process to enclose the input compressed AV data in a packet so as to create a data format that can be transmitted and received in accordance with the TCP/IP and then outputs a result of the processing. The first communication-protocol-processing unit 12 carries out the communication protocol processing by using a circuit implemented by hardware. Thus, the first communication-protocol-processing unit 12 is capable of carrying out the communication protocol processing at a sufficiently high speed even for a kind of data requiring that the communication protocol processing be carried out at a high speed as is the case with AV data.

A first control unit 13 is typically implemented by a microcomputer including components such as a CPU, a ROM and a RAM. The first control unit 13 is a component for carrying out a variety of control processes in the base-station apparatus 1.

A typical control process function of the first control unit 13 is explained as follows.

The first control unit 13 acquires a notice indicating a reception state of compressed AV data in the monitor apparatus 2. It is to be noted that, in the base-station apparatus 1, the notice transmitted by the monitor apparatus 2 is received by a first reception unit 15 to be described later and supplied to the first control unit 13 by way of a first router.

Then, the first control unit 13 controls the AV encoder 11 to generate compressed AV data with a proper compressibility (data rate) according to the notice, which typically indicates the state of a decoding process of compressed AV data. To be more specific, if the notice indicates a good state of a decoding process, the compressibility is set at a small value to give as a high image quality as possible. If the notice indicates a poor state of a decoding process due to a deteriorated reception condition, on the other hand, the compressibility is set at a large value and the data is transmitted at a low transfer rate so that data can be received as normally as possible.

In addition, specially in the case of this embodiment, the first control unit 13 is capable of carrying out a communication protocol process according to the TCP/IP, which is the communication protocol adopted by the embodiment. That is to say, the first control unit 13 has a function equalized to that of the first communication-protocol-processing unit 12 and implements the function of the communication protocol process as processing based on execution of software written as a predetermined program.

Furthermore, data to be processed by the communication protocol process function owned by the first control unit 13 is data received by the base-station apparatus 1. The data received by the base-station apparatus 1 includes operation information generated to represent an operation carried out on a touch panel 28 which is transmitted by the monitor apparatus 2, a variety of notifications including mainly a notice indicating a state of reception like the one described above and a command making a request for something. That is to say, the data received by the base-station apparatus 1 is communication data other than AV data. Moreover, the base-station apparatus 1 may transmit a notice or a command. Also in this case, the first control unit 13 carries out a communication protocol process on such a notice and such a command.

It is to be noted that, in the following description, communication data exchanged between the base-station apparatus 1 and the monitor apparatus 2 is information other than AV data.

As described above, the information other than AV data includes operation information, notices and commands. Mainly used in function control, these kinds of information are collectively referred to as control information to distinguish them from the AV data.

In the base-station apparatus 1, a first router 14 is placed between the first transmission/reception unit 15 on one side and the first communication-protocol-processing unit 12 as well as the first control unit 13 on the other side. The first router 14 operates to form a data path according to the type of exchanged data. To be more specific, in a transmission of compressed AV data generated by the AV encoder 11, the first router 14 forms a signal path for supplying the compressed AV data to be transmitted after being processed by the first communication-protocol-processing unit 12 to the first transmission/reception unit 15.

In addition, if data received by the first transmission/reception unit 15 is control information, the first router 14 forms a signal path to supply the control information to the first control unit 13. By the same token, in an operation to output and transmit control information generated by the first control unit 13, the first router 14 forms a signal path to supply the control information from the first control unit 13 to the first transmission/reception unit 15.

Provided with an antenna 16 typically like the one shown in FIG. 1, the first transmission/reception unit 15 is a member for carrying out radio transmissions and receptions of electromagnetic waves. To put it concretely, in a transmission, the first transmission/reception unit 15 receives data to be transmitted from the first router 14 and then outputs the data being transmitted as an electromagnetic wave having a predetermined carrier frequency.

On the other hand, the first transmission/reception unit 15 receives an electromagnetic wave transmitted by the monitor apparatus 2 and eliminates the component having the carrier frequency to extract a data component, which is then supplied to the first router 14.

Next, the internal configuration of the monitor apparatus 2 is explained.

The whole configuration for communications inside the monitor apparatus 2 is all but the same as the internal configuration of the base-station apparatus 1 described above. That is to say, the monitor apparatus 2 includes a second transmission/reception unit 21, a second router 22, a second communication-protocol-processing unit 23 and a second control unit 24. The basic configurations of these functional circuit units are all but identical with respectively the first transmission/reception unit 15, the first router 14, the first communication-protocol-processing unit 12 and the first control unit 13, which are employed in the base-station apparatus 1. The following description explains only differences in operation and other differences.

In addition, for outputting and displaying received compressed AV data by execution of a decoding process, the monitor apparatus 2 is provided with an AV decoder 25 in place of the AV encoder.

Assume for example that data received by the second transmission/reception unit 21 is compressed AV data. In this case, the second router 22 forms a signal path for supplying the compressed AV data passed on by the second transmission/reception unit 21 to the second communication-protocol-processing unit 23. If the data received by the second transmission/reception unit 21 is control information, on the other hand, the second router 22 forms a signal path for supplying the control information passed on by the second transmission/reception unit 21 to the second control unit 24. When it is necessary to transmit control information generated by the second control unit 24 to the base-station apparatus 1, the second router 22 switches the signal path so as to supply the control information to the second transmission/reception unit 21.

Much like the first communication-protocol-processing unit 12, the second communication-protocol-processing unit 23 carries out the communication protocol processing by using a dedicated communication circuit implemented by hardware. In this case, the second communication-protocol-processing unit 23 receives compressed AV data transferred to the second communication-protocol-processing unit 23 typically in packet units in a format of communication data in accordance with the TCP/IP. The second communication-protocol-processing unit 23 then carries out necessary processing including a process to unpack the input compressed AV data in the communication-data format and outputs a result of the processing to the AV decoder 25.

The AV decoder 25 carries out decompression processing adopting the MPEG technique on the input compressed AV data and outputs a result of the processing as received AV data. A display circuit unit not shown in the figure then displays a video signal of the received AV data on the display unit 27 as an image. In addition, an audio-output-processing unit also not shown in the figure outputs an audio data component of the received AV data to a speaker as a sound.

In the same way as the first control unit 13 employed in the base-station apparatus 1, the second control unit 24 employed in the monitor apparatus 2 controls operations carried out in the monitor apparatus 2. The second control unit 24 is configured so that a communication protocol process for the TCP/IP can be carried out by using software. Exchanged data includes control information other than AV data. The control information is subjected to the communication protocol process.

The second control unit 24 also monitors operations carried out by the AV decoder 25 and sets a compressibility (data rate) suitable for compressed AV data in accordance with error status. Then, a command specifying the compressibility is generated. The second control unit 24 further carries out a communication protocol process adopting the TCP/IP on this command specifying the compressibility to form communication data, which is then transferred to the second transmission/reception unit 21 by way of the second router 22, to be transmitted to the base-station apparatus 1 as control information.

As described before, when the first transmission/reception unit 15 employed in the base-station apparatus 1 receives the control information representing the command specifying the compressibility, the first transmission/reception unit 15 passes on the information to the first control unit 13 by way of the first router 14. The first control unit 13 executes software to carry out a communication protocol process typically to extract the control information from its packet. That is to say, the first control unit 13 acquires the command specifying the compressibility. Then, the first control unit 13 controls the AV encoder 11 so as to compress data at the compressibility indicated by the command.

As is obvious from the descriptions given so far, the base-station apparatus 1 and the monitor apparatus 2, which are implemented by the embodiment, each have a configuration capable of carrying out a communication protocol process for exchanging data with each other by using both hardware and software. To put it in detail, in the base-station apparatus 1, the first communication-protocol-processing unit 12 based on hardware is employed, and the first control unit 13 is provided with a software function for carrying out the communication protocol process. By the same token, in the monitor apparatus 2, the second communication-protocol-processing unit 23 based on hardware is employed and the second control unit 24 is provided with a software function for carrying out the communication protocol process.

In the case of this embodiment, the first communication-protocol-processing unit 12 and the second communication-protocol-processing unit 23 carry out processing on AV data while the first control unit 13 and the second control unit 24 are each a component in charge of processing on control information, which is information other than AV data. That is to say, AV data is processed by using hardware while control information other than AV data is processed by using software.

By processing AV data and control information in this way, AV data requiring that processing thereof be carried out at a high speed is processed by hardware so that, for example, time-series continuity of data is not lost. On the other hand, control information and other data are processed by using software, which has a low processing speed in comparison with hardware. However, the control information and the other data each have a small size and do not require the time-series continuity such as AV data. Thus, there is specially no raised problem in spite of the low processing speed of the software. In addition, by allowing the processing based on software to coexist with processing based on hardware, the executed program of the software can be just modified with ease in order to keep up with, for example, changes in communication protocol.

That is to say, this embodiment has a configuration in which it is possible to carry out communication protocol processes by using both hardware and software and either the hardware or the software can be used properly in accordance with the type of data to be processed. Thus, the requirements for high-speed processing and expandability are satisfied at a good balance.

In the base-station apparatus 1, the first router 14 determines whether the hardware or the software is to be used for carrying out a communication protocol process in dependence on the type of transmitted and received data. In the monitor apparatus 2, on the other hand, the second router 22 selects either the hardware or the software. For this reason, the configuration of the first router 14 and the second router 22 is explained next.

Figure 3:
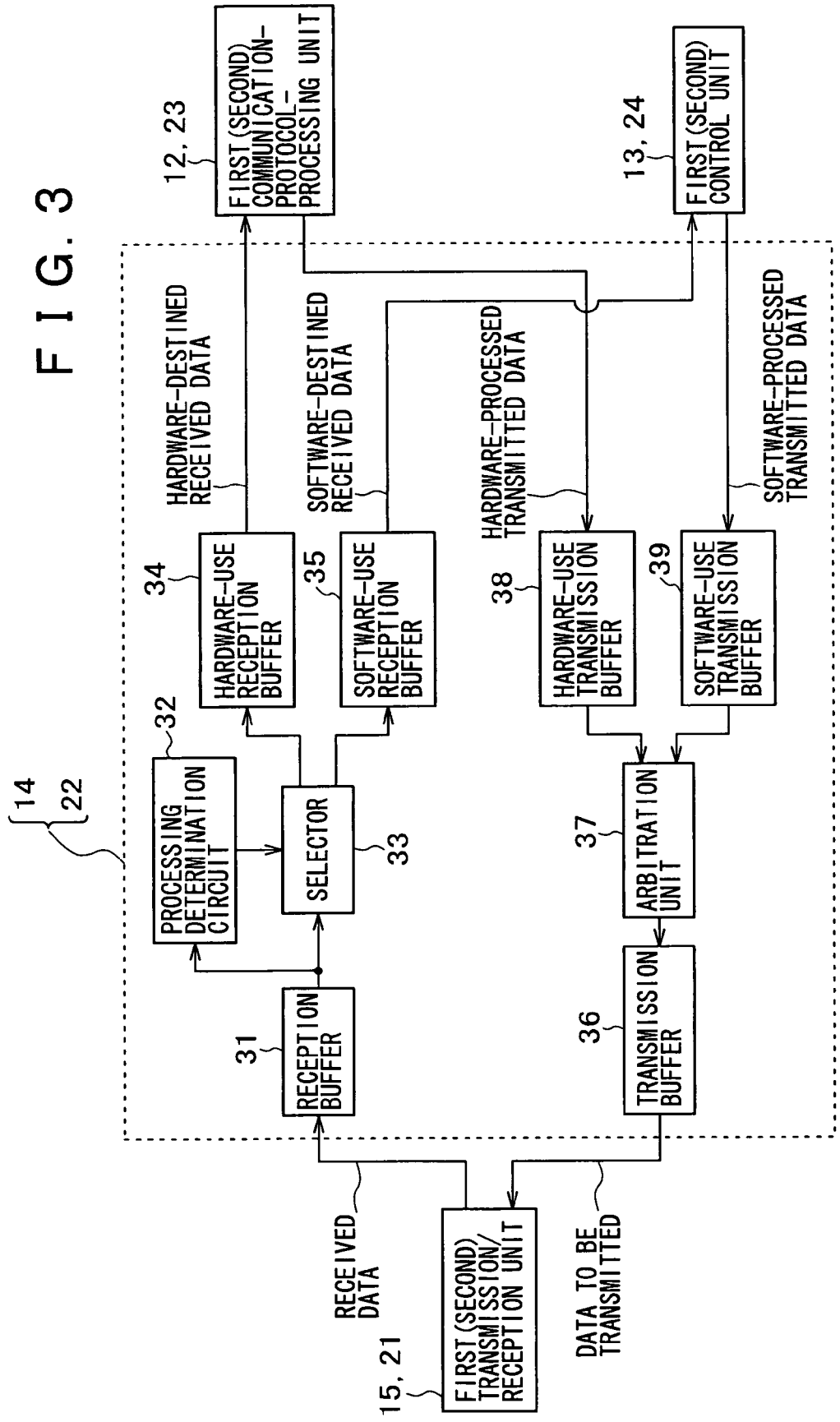
FIG. 3 is a block diagram showing a typical configuration of a router employed in the base-station apparatus and the monitor apparatus.

FIG. 3 is a diagram showing a typical configuration of the first router 14 and second router 22 shown in FIG. 1. It is to be noted that, both the first router 14 and the second router 22 have the configuration shown in FIG. 3. Thus, in accordance with the circuit configuration shown in FIG. 3, the second router 22 also has a configuration capable of transmitting AV data to the base-station apparatus 1 even though, in the configuration shown in FIG. 1, there is no case in which the monitor apparatus 2 transmits AV data to the base-station apparatus 1. In the following explanation, the base-station apparatus 1 and the second router 22 are both referred to simply as the router (14, 22) when it is not necessary to specially distinguish them from each other.

Data received by the first transmission/reception unit 15 (or the second transmission/reception unit 21) is stored in a reception buffer 31 employed in the router (14, 22). The received data is stored temporarily in the reception buffer 31. Typically, the data is read out back from the reception buffer 31 at a different clock frequency. The data output from the reception buffer 31 is supplied to a processing determination circuit 32 and a selector 33.

Necessary information prescribed by the TCP/IP communication protocol has been inserted into the received data in packet units. The information inserted in the data includes at least identification usable for identifying the type of the data. To be more specific, the identification indicates whether a packet contains AV data, that is, compressed AV data, or control information other than AV data.

The processing determination circuit 32 drives the selector 33 to switch a signal route on the basis of the identification usable for identifying the type of the data. In an operation to transfer data read out from the reception buffer 31 in packet units, the selector 33 selects either a hardware-use reception buffer 34 or a software-use reception buffer 35 as a transfer destination.

Thus, if the processing determination circuit 32 detects an identification indicating that a packet transferred from the reception buffer 31 contains AV data, the selector 33 selects the hardware-use reception buffer 34 as the transfer destination. If the processing determination circuit 32 detects an identification indicating that a packet transferred from the reception buffer 31 contains control information, on the other hand, the selector 33 selects the software-use reception buffer 35 as the transfer destination.

In the hardware-use reception buffer 34, an input AV-data packet is stored temporarily before being output to the first communication-protocol-processing unit 12 (or the second communication-protocol-processing unit 23) as hardware-destined received data. By the same token, in the software-use reception buffer 35, an input control-information packet is stored temporarily before being output to the first control unit 13 (or the second control unit 24) as software-destined received data.

In this way, received data is sorted into the type of the data. To put it concretely, in this embodiment, AV data is transferred to the first communication-protocol-processing unit 12 (or the second communication-protocol-processing unit 23) to be processed by using hardware while control information is transferred to the first control unit 13 (or the second control unit 24) to be processed by using software.

By referring to FIG. 4, the following description explains a typical switching operation carried out by the processing determination circuit 32 to drive the selector 33.

Assume that the IP version of the TCP/IP is IPv4, which prescribes that a TOS is inserted into exchanged data. The TOS is information for identifying a service. In the case of this embodiment, a difference in data type also means a difference in service. Thus, the switching control of the selector 33 can be executed by identifying the type of data on the basis of the value of the TOS field.

For example, assume that a packet contains AV data. In this case, the value of the TOS field in the packet should be set at 1. If the packet contains control inform defined in this embodiment, on the other hand, the value of the TOS field in the packet should be set at 4.

Thus, the processing determination circuit 32 must be capable of at least determining whether the value of the TOS field inserted into a packet is 1 or 4. Then, if the value of the TOS field is 1, the configuration of the selector 33 causes the hardware-use reception buffer 34 (Hard) to be selected and, if the value of the TOS field is 4, on the other hand, the configuration of the selector 33 causes the software-use reception buffer 35 (Soft) to be selected as shown in FIG. 4.

In addition, the embodiment prescribes the software-use reception buffer 35 (Soft) as an initially set buffer (of a default buffer) chosen among the hardware-use reception buffer 34 (Hard) and the software-use reception buffer 35 (Soft). Thus, if the TOS field is set at a value other than 1 and 4, the software-use reception buffer 35 is selected univocally.

If the IP version of the TCP/IP is IPv4, a combination of an IP address and a port number is univocally determined in accordance with the type of the transmitted data (the service). This is because, in this case, an IP address is assigned to each piece of equipment whereas a port number may be a number showing a service with the IP address used as a base.

For the reason described above, it is possible to provide a configuration in which the processing determination circuit 32 identifies a combination of an IP address and a port number, driving the selector 33 to select the software-use reception buffer 35 or the hardware-use reception buffer 34 in accordance with the result of the identification. An example of such a configuration is shown in FIG. 5.

In the following explanation of the configuration shown in FIG. 5, the router shown in FIG. 3 is assumed to be the second router 22 employed in the monitor apparatus 2. The IP address of the monitor apparatus 2 serving as a transmission destination (Destination IP) is assumed to be 192.10.10.2. For example, AV data is transmitted from the base-station apparatus 1 to the monitor apparatus 2. In this case, combinations of IP addresses and port numbers stored in the packet containing the AV data are listed below as shown in FIG. 5.

IP address of the transmission source (Source IP)=192.10.10.1

Port number of the transmission source (Source Port #)=100

IP address of the transmission destination (Destination IP)=192.10.10.2

Port number of the transmission destination (Destination Port #)=90

When control information is transmitted and received, on the other hand, combinations of IP addresses and port numbers stored in the packet containing the AV data are listed below as shown in FIG. 5.

IP address of the transmission source (Source IP)=192.10.10.3

Port number of the transmission source (Source Port #)=10

IP address of the transmission destination (Destination IP)=192.10.10.2

Port number of the transmission destination (Destination Port #)=10

In this case, there is provided a configuration in which the processing determination circuit 32 is capable of detecting the combinations of values of the IP addresses and the port numbers for AV data or the combinations of values of the IP addresses and the port numbers for control information, and then driving the selector 33 to select the hardware-use reception buffer 34 or the software-use reception buffer 35 in accordance with a result of the detection. To be more specific, if the processing determination circuit 32 detects the combinations of values of the IP addresses and the port numbers for AV data, the processing determination circuit 32 drives the selector 33 to select the hardware-use reception buffer 34 (Hard). If the processing determination circuit 32 detects the combinations of values of the IP addresses and the port numbers for control information, on the other hand, the processing determination circuit 32 drives the selector 33 to select the software-use reception buffer 35 (Soft).

If the processing determination circuit 32 detects combinations of values other than the values of the IP addresses and the port numbers for AV data and other than the values of the IP addresses and the port numbers for control information, the processing determination circuit 32 drives the selector 33 to select the software-use reception buffer 35 (Soft), which is prescribed to be the initially set buffer (default buffer).

As described above, in the embodiment, it is possible to identify the type of received data contained in a packet on the basis of information included in the packet and then properly select hardware or software as an executer of a communication protocol process to be carried out on the packet in dependence on a result of the identification.

It is to be noted that the configuration of the processing determination circuit 32 for detecting a TOS or combinations of IP addresses and port numbers and for controlling the selector 33 can be constructed as a hardware circuit.

In addition, IPv6 is also known as an IP version of the TCP/IP. In this case, the so-called flow label can be used by the processing determination circuit 32 as information for identifying the type of data.

Furthermore, it is also possible to conceive a configuration in which the amount of data received per unit time is found for each type of data and the processing determination circuit 32 controls the selector 33 in correspondence to the amount of data.

In this case, the amount of AV data received per unit time is extremely large but the size of control information is typically about several packets at the most so that the amount of control information received per unit time is small. Thus, the processing determination circuit 32 is capable of correctly controlling the selector 33 in dependence on whether the received data is AV data or control information.

The description described above has explained a process carried out by the router (14, 22) shown in FIG. 3 on received data only. Data to be transmitted is processed as follows. In the explanation of a process to transmit data, the router (14, 22) shown in FIG. 3 is the first router 14 employed in the base-station apparatus 1.

In a process carried out by the base-station apparatus 1 to transmit AV data, the data is processed by using hardware in the first communication-protocol-processing unit 12 before being supplied to the first router 14. In a process carried out by the base-station apparatus 1 to transmit control information, on the other hand, the information is processed by using software in the first control unit 13 before being supplied to the first router 14.

The AV data input to the first router 14 after completing a process using hardware in the first communication-protocol-processing unit 12 is supplied to a hardware-processing transmission buffer 38 as shown in the figure. This AV data input to the first router 14 after completing the process using hardware in the first communication-protocol-processing unit 12 is referred to as hardware-processed transmitted data. The hardware-processed transmitted data is read out back from the hardware-processing transmission buffer 38 at a different clock frequency. On the other hand, the control information input to the first router 14 after completing a process using software in the first control unit 13 is supplied to a software-processing transmission buffer 39. This control information input to the first router 14 after completing the process using software in the first control unit 13 is referred to as software-processed transmitted data. By the same token, the software-processed transmitted data is read out back from the software-processing transmission buffer 39 at a different clock frequency.

The hardware-processed transmitted data output from the hardware-processing transmission buffer 38 and the software-processed transmitted data output from the software-processing transmission buffer 39 each have already completed a communication protocol process enclosing the data in packets. In a process to transmit the hardware-processed transmitted data and the software-processed transmitted data, their packets are output in a state of being multiplexed on a time-division basis.

An arbitration unit 37 multiplexes the packets of the hardware-processed transmitted data and the packets of the software-processed transmitted data on a time-division basis. The time division used as a basis of the multiplexing process is set in accordance with a ratio of the number of transferred packets of the hardware-processed transmitted data transferred per unit time to the number of transferred packets of the software-processed transmitted data transferred per unit time.

In addition, in the case of this embodiment, the hardware-processed transmitted data is AV data while the software-processed transmitted data is control information. Thus, the amount of hardware-processed transmitted data transferred per unit time must be assured to exceed a predetermined value in order to sustain the time-series continuity. On the other hand, the software-processed transmitted data has a small amount and has no requirement for the time-series continuity.

For the reasons described above, the arbitration unit 37 employed in this embodiment sets a ratio of the amount of hardware-processed transmitted data transferred per unit time to the amount of software-processed transmitted data transferred per unit time at a large value. Details of this ratio setting will be explained later. That is to say, which data is to be transferred per unit time is determined on a priority basis. In this case, a high priority is given to the hardware-processed transmitted data. By doing so, it is possible to output the packets of the hardware-processed transmitted data and the packets of the software-processed transmitted data on a time-division basis with a high degree of efficiency.

A transmission buffer 36 then receives a sequence of the packets of the hardware-processed transmitted data and the packets of the software-processed transmitted data, which are multiplexed with each other on a time-division basis. The data is stored temporarily in the transmission buffer 36 before being output in packet units with required timings to the first transmission/reception unit 15 as data being transmitted.

Figure 6:
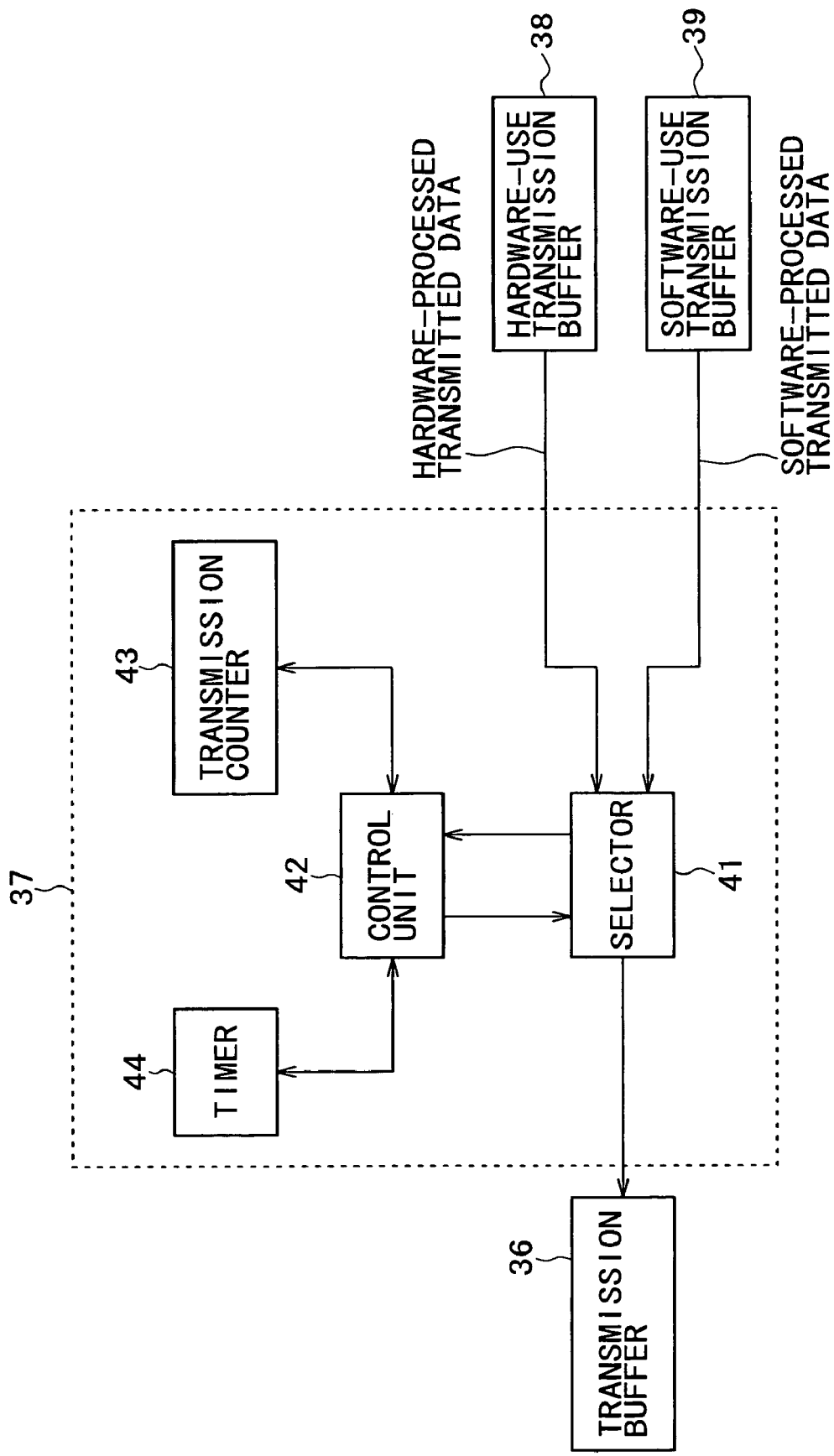
FIG. 6 is a block diagram showing a typical internal configuration of an arbitration unit employed in the router.

FIG. 6 is a block diagram showing a typical internal configuration of the arbitration unit 37.

As shown in the figure, the arbitration unit 37 typically includes a selector 41, a control unit 42, a transmission counter 43 and a timer 44.

The selector 41 selects hardware-processed transmitted data or software-processed transmitted data in an alternative way and outputs the selected data to the transmission buffer 36. It is to be noted that the selector 41 supplies the selected data to the transmission buffer 36 in packet units. The control unit 42 controls an operation carried out by the selector 41 to switch a signal route. In executing the control, the control unit 42 fetches necessary information inserted into a packet input to the selector 41 and determines as to whether packets input to the selector 41 include a packet of hardware-processed transmitted data or a packet of software-processed transmitted data on the basis of the substance of the information. Then, the control unit 42 controls the operation carried out by the selector 41 to switch a signal route in accordance with the result of the determination.

A high priority is assigned to an amount of data transferred per unit time on the basis of a result of comparing the count value of the transmission counter 43 with a predetermined threshold value.

The transmission counter 43 is a counter incremented by 1 every time a packet of hardware-processed transmitted data is transmitted.

If hardware-processed transmitted data (or AV data) is not transferred for a period of time longer than a predetermined value, it is necessary to drive the selector 41 to make a switch to select software-processed transmitted data as data to be transmitted by ignoring the priority assigned to hardware-processed transmitted data. The timer 44 is provided for determining whether or not the period of time has exceeded a predetermined value.

Figure 7:
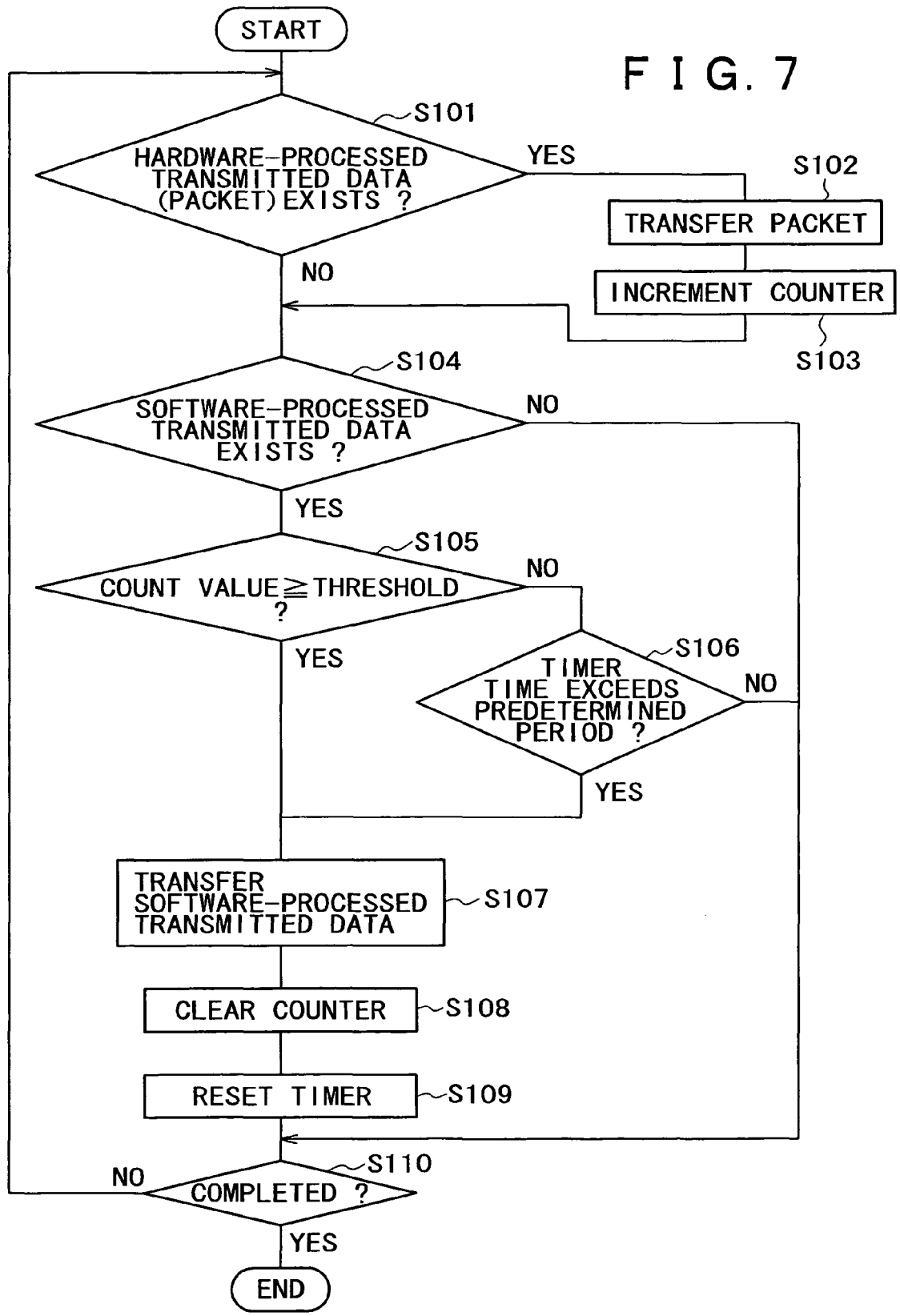
FIG. 7 shows a flowchart referred to in explaining the flow of an operation carried out by a control unit employed in the arbitration unit.
Figure 8:
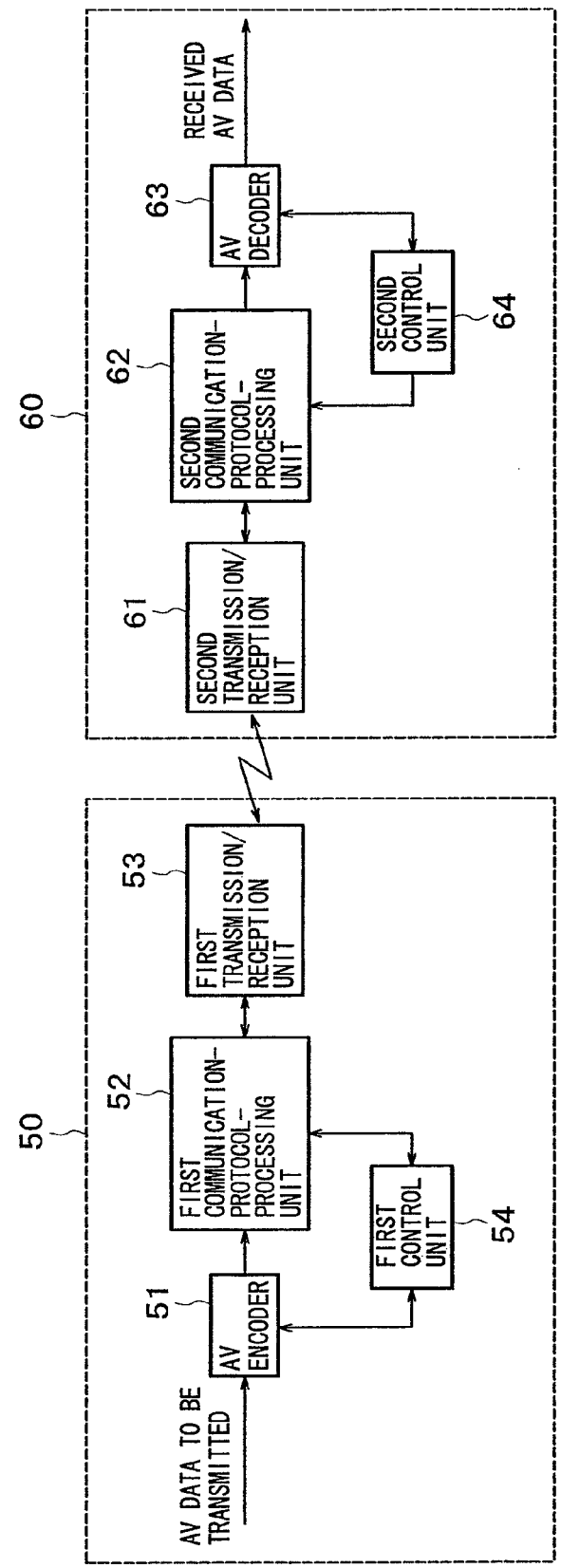
FIG. 8 is a block diagram showing typical configurations of the conventional base-station apparatus and the conventional monitor apparatus.
Figure 9:
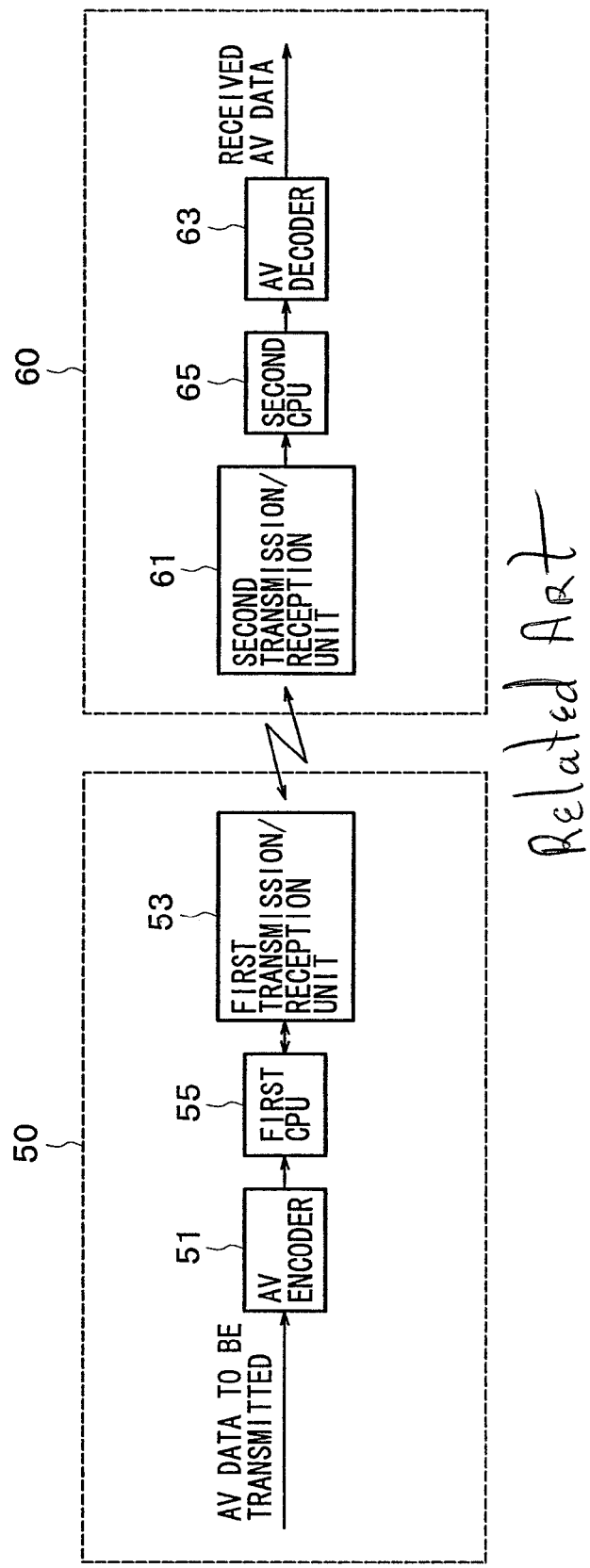
FIG. 9 is a block diagram showing other typical configurations of the conventional base-station apparatus and the conventional monitor apparatus.

FIG. 7 shows a flowchart referred to in explaining the flow of operations carried out by the control unit 42 employed in the arbitration unit 37 shown in FIG. 6. It is to be noted that the internal configuration of the arbitration unit 37 can all be implemented by for example hardware. It is thus possible to use hardware for actually implementing the operation carried out by the control unit 42 in accordance with the flowchart shown in FIG. 7.

First of all, at a step S101, the control unit 42 determines as to whether or not packets to be supplied to the selector 41 include a packet of hardware-processed transmitted data. In the case of a control unit 42 implemented by hardware, it is possible to provide a configuration for determining in which a result of determination can be obtained by fetching a bit pattern from a predetermined area in the header of the packet currently supplied to the selector 41.

If the result of the determination formed at the step S101 is an affirmation indicating that the packets to be supplied to the selector 41 include a packet of hardware-processed transmitted data, the flow of the operations goes on to a step S102 at which a packet of hardware-processed transmitted data is selected and transmitted by way of the transmission buffer. Then, at the next step S103, the count value of the transmission counter 43 is incremented to reflect the completion of the transmission of the packet of hardware-processed transmitted data.

If the result of the determination formed at the step S101 is a denial indicating that the packets to be supplied to the selector 41 do not include a packet of hardware-processed transmitted data, on the other hand, the flow of the operations goes on to a step S104. The flow or the operations also goes to the step S104 after completing the operation carried out at the step S103.

At a step S104, the control unit. 42 determines as to whether or not packets to be supplied to the selector 41 include a packet of software-processed transmitted data. If the result of the determination is a denial indicating that the packets to be supplied to the selector 41 do not include a packet of software-processed transmitted data, the flow of the operations goes on to a step S110 to determine as to whether or not the operations to transmit data have been completed. If the operations to transmit data have not been completed, the flow of the operations goes back to the step S101.

Thus, at a normal time at which software-processed transmitted data representing communication information is not received, the selector 41 is controlled to select hardware-processed transmitted data, which has a higher priority.

As an operation to output software-processed transmitted data from the software-processing transmission buffer 39 is started, an affirmation result of the determination is obtained at the step S104. In this case, the flow of the operations goes on to a step S105 at which the control unit 42 loads the count value of the transmission counter 43 and determines as to whether or not the count value has become equal to or greater than a threshold value set in the control unit 42 in advance.

If the result of the determination formed at the step S105 is an affirmation indicating that the count value has become equal to or greater than the threshold value, the flow of the operations goes on to a step S107 at which the selector 41 is controlled to transfer software-processed transmitted data to the transmission buffer 36. It is to be noted that, the data transferred to the transmission buffer 36 at that time is a packet of software-processed transmitted data. Then, at the next step S108, the count value of the transmission counter 43 is cleared to typically 0. Subsequently, at the next step 109, the timer 44 is reset. Then, the flow of the operations goes on to the step S110 to determine as to whether or not the operations to transmit data have been completed. If the operations to transmit data have not been completed, the flow of the operations goes back to the step S101.

If the result of the determination formed at the step S105 is a denial indicating that the count value is smaller than the threshold value, on the other hand, the flow of the operations goes on to a step S106 to determine as to whether or not the time measured by the timer 44 has exceeded a period of time set in advance.

If the result of the determination formed at the step S106 is a denial indicating that the time measured by the timer has not exceeded the predetermined period of time, the flow of the operations goes on directly to the step S110, skipping the step S107 and the subsequent steps. If the result of the determination formed at the step S110 indicates that the operations to transmit data have not been completed, the flow of the operations goes back to the step S101.

If the result of the determination formed at the step S106 is an affirmation indicating that the time measured by the timer has exceeded the predetermined period of time, on the other hand, the flow of the operations goes on to the step S107 at which the selector 41 is controlled to make a switch to a transfer of software-processed transmitted data.

Thus, in this embodiment, even if software-processed transmitted data has already been stored in the software-processing transmission buffer to be supplied to the selector 41, the data is not read out by the selector 41 as long as the time measured by the timer has not exceeded the predetermined period of time. Instead, the selector 41 keeps transferring packets of hardware-processed transmitted data continuously till the number of packets represented by the count value of the transmission counter 43 reaches the threshold value set for the transmission counter 43. As the number of packets reaches the threshold value, a packet of software-processed transmitted data is transmitted. In other words, every time as many packets of hardware-processed transmitted data as indicated by the threshold value are transferred, a packet of software-processed transmitted data is transferred.

To put it concretely, assume that the threshold value is 10. In this case, operations are carried out repeatedly to transfer 1 packet of software-processed transmitted data for every 10 transferred packets of hardware-processed transmitted data. Thus, as is obvious from the above description, by increasing or decreasing the threshold value, it is possible to adjust the priority level at which hardware-processed transmitted data is to be transferred.

The judgment is formed at the step S106 to prevent continuation of a state in which the operation to transfer hardware-processed transmitted data is stopped with the transmission counter 43 staying at a count value smaller than the threshold value. As such a state continues for a duration exceeding the predetermined period of time, the selector 41 transfers a packet of software-processed transmitted data stored in the software-processing transmission buffer. In this way, normal transmission of control information is taken into consideration.

It is to be noted that the circuit configuration shown earlier in FIG. 3 is a configuration common to the first router 14 and the second router 22. In actuality, however, specifications prescribe that no AV data is output and transmitted from the monitor apparatus 2 to the base-station apparatus 1. It is thus possible to provide a configuration, in which a circuit for routing hardware-processed transmitted data received from the monitor apparatus 2 can be omitted from the first router 14 employed in the base-station apparatus 1 and a circuit for routing hardware-processed transmitted data can be omitted from the second router 22 employed in the monitor apparatus 2.

In addition, in the embodiment described above, data is exchanged by radio communication between apparatus conforming to the TCP/IP. As a matter of course, however, the present invention can also be applied to a configuration in which data is exchanged by wired communication between apparatus connected to each other by a cable. Furthermore, the communication protocol is not limited to the TCP/IP for the Internet. That is to say, another communication protocol can be adopted.

Moreover, while the embodiment described above implements a transmission/reception system including a base-station apparatus and a monitor apparatus, the present invention can also be applied to a transmission/reception system having another configuration.

As described above, the present invention provides a configuration in which transmission/reception apparatus for transmitting and receiving data in accordance with a predetermined communication protocol are capable of carrying out communication protocol processes by using both hardware and software. Thus, hardware or software can be selected properly in accordance with the type of data. For example, a communication protocol process for data regarded as a heavy processing load can be carried out by using hardware at a high speed, whereas a communication protocol process for data regarded as a light processing load can be carried out by using software, which offers good expandability. That is to say, in execution of communication protocol processes in accordance with the present invention, it is possible to achieve both the high processing speed and the good expandability.

To put it concretely, by providing a transmission/reception system having been becoming popular and remarkably growing particularly in recent years as a system for exchanging data including AV data with a configuration where the AV data (image and/or sound/voice information) is processed by using hardware while information other than the AV data such as communication information is processed by using software, it is possible to fully derive benefits from the merit of the fact that both the high processing speed and the good expandability can be achieved.

On the top of that, it is also possible to provide a configuration in which, for example, the apparatus on the transmission side outputs hardware-processed data to be transmitted by taking precedence of software-processed data to be transmitted. That is to say, data to be transmitted at a high rate of the order requiring hardware to be used for processing is output, taking precedence of data imposing a small processing load allowing software to be used for processing. It is thus possible to obtain a data transmission amount suitable for the type of the transmitted data.

On the other hand, the apparatus on the reception side has a configuration in which processing of received data can be switched from a process carried out by using hardware to a process carried out by using software or vice versa on the basis of information usable for indicating the service type of the received data or on the basis of addresses of the transmission source and the transmission destination as well as service identification numbers used by the transmission source and the transmission destination. An example of the information usable for indicating the service type of the received data is the information stored in the TOS field. The service identification numbers are identifications of the types of the transmitted and received data. That is to say, in this configuration, by referencing predetermined information prescribed by the communication protocol, it is possible to easily implement effective proper selection of hardware or software as means for processing received data.

The invention claimed is:

1. A transmission apparatus including at least one processor for transmitting data in a predetermined communication protocol, the transmission apparatus comprising:

storing means for storing data;

first communication-protocol-processing means for carrying out necessary processing in accordance with a predetermined communication protocol on image and/or audio information as data to be transmitted by using hardware;

second communication-protocol-processing means for carrying out necessary processing in accordance with the predetermined communication protocol on predetermined information other than said image and/or audio information as data to be transmitted by using software;

transmission means for outputting and transmitting data being transmitted; and connection-switching means capable of selecting said first communication-protocol-processing means or said second communication-protocol-processing means as means to be connected to said transmission means so as to select transmitted data processed by said first communication-protocol-processing means, taking precedence of transmitted data processed by said second communication-protocol-processing means, wherein the data is transmitted in packets, and the predetermined information other than the image and/or audio information and the image and/or audio information are transmitted in different packets, and packets of the predetermined information other than the image and/or audio information and the image and/or audio information are transmitted on a time-division basis, a time division being set in accordance with a ratio of a number of transferred packets processed by the hardware to a number of transferred packets processed by the software, wherein the connection-switching means selects the first communication-protocol-processing means or the second communication-protocol-processing means based on an amount of data received per unit time.

2. The transmission apparatus according to claim 1, wherein said communication protocol is a communication protocol related to the Internet.

3. A reception apparatus including at least one processor for receiving data in a predetermined communication protocol, the reception apparatus comprising:

storing means for storing data;

reception means for receiving data transmitted in accordance with a predetermined communication protocol;

first communication-protocol-processing means for carrying out necessary processing in accordance with said predetermined communication protocol on received data by using hardware;

second communication-protocol-processing means for carrying out necessary processing in accordance with said predetermined communication protocol on received data by using software; and connection-switching means capable of selecting said first communication-protocol-processing means if data received by said reception means is image and/or sound information or said second communication-protocol-processing means if data received by said reception means is predetermined information other than said picture and/or sound information as means to be connected to said reception means, wherein the data is transmitted in packets, and the predetermined information other than the image and/or audio information and the image and/or audio information are transmitted in different packets, and packets of the predetermined information other than the image and/or audio information and the image and/or audio information are transmitted on a time-division basis, a time division being set in accordance with a ratio of a number of transferred packets processed by the hardware to a number of transferred packets processed by the software, wherein the connection-switching means selects the first communication-protocol-processing means or the second communication-protocol-processing means based on an amount of data received per unit time.

4. The reception apparatus according to claim 3, wherein said connection-switching means determines either said first communication-protocol-processing means or said second communication-protocol-processing means as means to be connected to said reception means on the basis of information, which has been inserted into data received by said reception means and is used to indicate a service type of the data.

5. The reception apparatus according to claim 3, wherein said connection-switching means determines either said first communication-protocol-processing means or said second communication-protocol-processing means as means to be connected to said reception means on the basis of information, which has been inserted into data received by said reception means and is used to represent addresses of a transmission source and a transmission destination as well as service identification numbers in the transmission source and the transmission destination to indicate a type of transmitted and received data.

6. The reception apparatus according to claim 3, wherein said communication protocol is a communication protocol related to the Internet.

7. A transmission/reception apparatus including at least one processor for transmitting/receiving data in a predetermined communication protocol, the transmission/reception apparatus comprising:

storing means for storing data, first communication-protocol-processing means for carrying out necessary processing in accordance with a predetermined communication protocol on image and/or audio information as data to be transmitted or necessary processing in accordance with said predetermined communication protocol on image and/or audio information as data to be received by using hardware;

second communication-protocol-processing means for carrying out necessary processing in accordance with said predetermined communication protocol on predetermined information other than said image and/or audio information as data to be transmitted or necessary processing in accordance with said predetermined communication protocol on predetermined information other than said image and/or audio information as data to be received by using software;

transmission/reception means for outputting and transmitting said data being transmitted in accordance with said predetermined communication protocol or for receiving data transmitted in accordance with said predetermined communication protocol; and connection-switching means capable of selecting said first communication-protocol-processing means or said communication-protocol-processing means as means to be connected to said transmission/reception means in such a way that in an operation to output and transmit transmitted data, said transmitted data processed by said first communication-protocol-processing means is selected, taking precedence of said transmitted data processed by said second communication-protocol processing means; whereas in an operation to receive data, said connection-switching means selects said first communication-protocol-processing means as means to be connected to said transmission/reception means if said data received by said reception/transmission means is picture and/or sound information, or said second communication-protocol-processing means as means to be connected to said transmission/reception means if said data received by said reception/transmission means is predetermined information other than said picture and/or sound information as means to be connected to said transmission/reception means, wherein the data is transmitted in packets, and the predetermined information other than the image and/or audio information and the image and/or audio information are transmitted in different packets, and packets of the predetermined information other than the image and/or audio information and the image and/or audio information are transmitted on a time-division basis, a time division being set in accordance with a ratio of a number of transferred packets processed by the hardware to a number of transferred packets processed by the software, wherein the connection-switching means selects the first communication-protocol-processing means or the second communication-protocol-processing means based on an amount of data received per unit time.

8. The transmission/reception apparatus according to claim 7, said communication protocol is a communication protocol related to the Internet.

* * * * *